March 14, 1967 — W. W. STEVENSON — 3,308,661

FLOW METER WITH DAMPENING MEANS

Filed Sept. 28, 1964

INVENTOR.
Wilbur W. Stevenson
BY
Frederick Slopor

United States Patent Office 3,308,661
Patented Mar. 14, 1967

3,308,661
FLOW METER WITH DAMPENING MEANS
Wilbur W. Stevenson, 1125 Lancaster Ave.,
Pittsburgh, Pa. 15218
Filed Sept. 28, 1964, Ser. No. 399,624
3 Claims. (Cl. 73—202)

This invention relates to flow meters particularly adapted to measure the amount of steam or other gaseous fluid passing through a conduit.

There is disclosed in my application Ser. No. 213,192, now U.S. Patent No. 3,183,712, filed July 30, 1962, a turbine flow meter that will accurately measure the flow of steam or other fluid over a relatively wide range of flow rates. The present invention constitutes an improvement on that flow meter.

In order to provide for the accurate measurement of flow through a conduit, the present invention, similar to application Serial No. 213,192, employs a meter by-pass line having an inlet and outlet in the conduit conveying the fluid to be measured, the inlet being at the upstream face of an orifice insert ring in the conduit, while the outlet is at the downstream side of the orifice insert ring thereby enabling an incremental flow of fluid in the meter by-pass line proportional to the flow of fluid in the conduit.

An object of the invention is to provide a novel flow meter construction for use with steam to insure water for damping purposes being present under all steam flow conditions.

A further object of the invention is to provide a simple, reliable and economical turbine flow meter apparatus for accurately measuring the flow of a gaseous fluid in any conduit under a variety of flow conditions.

A still further object of the invention is to provide a casing for a measuring turbine in a steam meter which casing not only provides for water being present for damping, but also provides an integral damping component.

Figure 1:
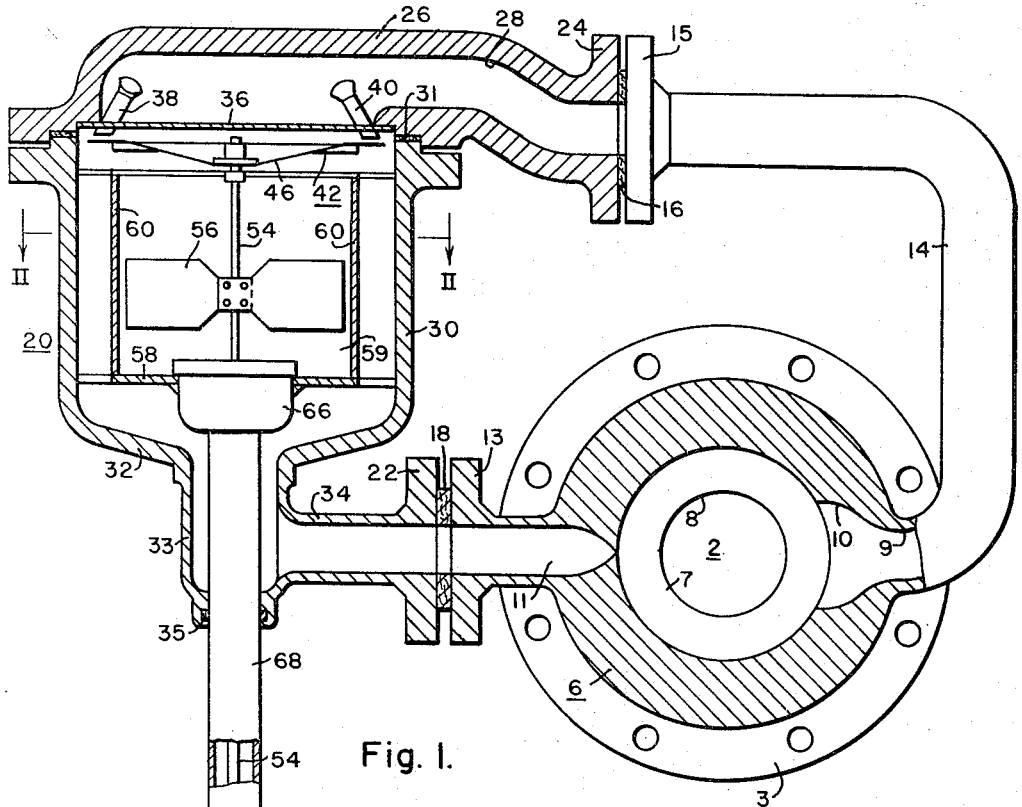
Figure 2:
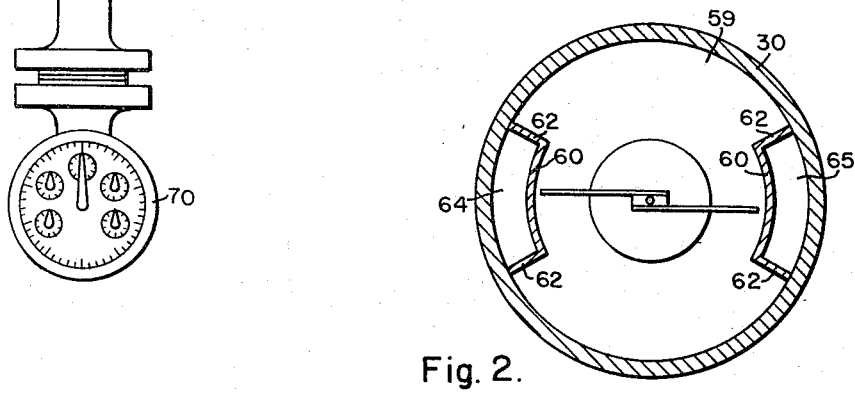

Other objects of the invention will in part be obvious and will in part appear hereinafter. For a better understanding of the nature and objects of the invention, reference should be had to the following detailed description and drawing, in which:

FIGURE 1 is a vertical section through a portion of flow meter constructed in accordance with the invention, and FIG. 2 is a section on line II—II of FIG. 1.

Broadly, the present invention comprises a simple, reliable and low cost flow-meter apparatus capable of measuring the amount of any considerable gaseous fluid, such as steam, passing through any conduit over an extremely wide range of flow rates. More particularly the casing for the measuring turbine proper is so constructed that it ensures an adequate quantity of water condensate is present at all times for the proper damping of the turbine rotor. The casing is provided with walls forming channels to convey exhaust steam after its passage through the rotor, and the walls concurrently function to cooperate as damping members with damping vanes attached to the rotor. Basically, the casing and turbine damping means of the present invention are much simpler as well as being more reliable than that shown in my earlier patent application Ser. No. 213,192.

Referring to FIGURES 1 and 2 of the drawing, there is illustrated in detail the apparatus of the present invention embodying in the combination much of the improved meter more fully set forth in my copending application Serial No. 213,192. In a conduit 2 steam, for example, flowing in the direction away from the observer in FIG. 1, is to be measured by the meter of this invention. Between flanges 3 in the conduit 2 held in sealed relation by gaskets is an insert ring orifice 6 which comprises an orifice proper 7 having an accurately machined orifice opening 8. Steam flowing down the conduit 2 on meeting the constriction presented by the orifice 7 develops an increased pressure at the upstream face thereof and a portion flows into a by-pass inlet 9 from the relatively wide mouth 10. It will be understood that on the down-stream face of the orifice 7 a reduced pressure develops and as a consequence line 11 which flows into a wide mouth functions as the by-pass outlet. The differential pressure between inlet 9 and outlet 11 is proportional to the flow rate in the conduit 2 and is effective to force a portion of the steam to flow into the by-pass line from the insert ring 6.

The inlet 9 comprises a tube or pipe 14 which is affixed by a flange 15 and gasket 16 to the flange 24 of a meter 20. The outlet line 11 includes a flange 13 which is attached to a second flange 22 of the meter 20.

The meter 20 comprises an upper cover 26 which comprises a bore 28 for conveying steam from inlet pipe 14. A meter casing 30 is fitted in contact with cover 26, with a gasket 31 providing a seal therebetween. The casing 30 is in the form of a bowl having a sloping bottom portion 32 which terminates in a hollow stem 33 having a lateral extension 34 terminating in flange 22. The stem 33 has a sealing gasket 35 at its lower end encircling a tube 68.

Inset in a recess in cover 26 is a flat plate 36 which is provided with two angularly disposed nozzles 38 and 40 to direct jets of steam into the chamber formed by casing 30 so as to impinge on peripheral pins of a rotor 42 to cause it to turn in proportion to the velocity of the jets of steam. The rotor 42 comprises a series of round pins affixed to the periphery of a concave hub 46 fastened at shaft 54. Fastened to the shaft 54 at a point below the rotor 42 are damping blades 56 which turn in a chamber 59 formed by a bottom 58 and a portion of the walls of casing 30, as is evident in FIGURE 2. Extending below the outlet ends of nozzles 38 and 40 are two circumferential channels formed by arcuate portions 60 and radial ends 62 affixed to the walls of casing 30 to form steam exhaust channels 64 and 65. The walls 60–62 of channels 64 and 65 constitute protuberances extending close to the path of rotation of damping blades 56 which turn in the condensate water filling chamber 59, and the channel walls 60–62 thereby assist in the damping function by exerting a damping force on the blades.

As is evident, the chamber 59 has a major portion of its wall comprised of the casing 30 so that heat from the condensate contained within it is readily dissipated to the atmosphere to which the casing is directly exposed. It has been found that when highly superheated steam is being measured it may introduce sufficient heat to cause the condensate present therein to evaporate from damping chambers that do not have their walls so exposed to the exterior. In the present casing design, this shortcoming is avoided, and water is always present in chamber 59 regardless of the steam temperature or its degree of superheat.

The steam exhausting from the rotor 42 then passes through exhaust channels 64 and 65, and carries with it any condensate in the form of droplets of water condensed within the space surrounding the rotor. This excess water passes or spills over the upper lip of walls 60–62, and thence flows within the passage formed by 32, 33 and finally into the lateral extension 34 and thence into the steam conduit 2.

At the bottom of chamber 59 is affixed a reducing gear casing 66 which is connected to the tube 68 with which gasket 35 makes a liquid and steam tight seal. Tube 68 and the reducing gear casing 66 are both completely filled with water, during operation of the meter.

The shaft 54 passes down tube 68 and its lower end turns a register 70 through a magnetic coupling separated by a diaphragm whose construction and mode of operation are as illustrated in my copending application Serial No. 213,192.

The range of the meter of FIGURE 1 may be extended to enable high accuracy at low flow rates of steam in conduit 2 by using a butterfly valve type of baffle in ring orifice 7, not shown here, but is illustrated and disclosed in my application Serial No. 213,192.

The invention should be interpreted broadly in the light of the above description and drawing.

I claim:

1. In a meter, in combination, a conduit conveying a condensible gaseous fluid to be measured, an orifice in the conduit, means including a meter for conveying a portion of the fluid from the upstream face of the orifice and passing it to the meter for measuring the quantity of fluid so conveyed, the meter comprising a rotatable turbine, damping blades attached to the turbine, a damping liquid comprising condensed fluid associated with the damping blades, a casing for holding the damping liquid, the casing having walls exposed to the atmosphere to maintain the liquid at relatively low temperature to prevent undue evaporation thereof, and the casing including additional walls forming channels with said walls exposed to the atmosphere for passage of exhaust steam from the turbine to the downstream face of the orifice, the additional channel walls being positioned and extending close to the path of rotation of the damping blades whereby to assist in exerting a damping force thereon.

2. The meter of claim 1 wherein the said additional walls in the casing form two channels are open at the top whereby excess water condensate in the casing can spill over into the channels and pass to the downstream face of the orifice and thereby be maintained at a desired level.

3. The meter of claim 1 wherein the additional walls comprise arcuate portions extending close to the path of rotation of the extremities of the damping blades, and substantially radially extending wall portions extending from the sides of the arcuate portions to the walls exposed to the atmosphere to form the channels for passage of the exhaust steam from the turbine.

References Cited by the Examiner

UNITED STATES PATENTS

| | | | |
|---|---|---|---|
| 1,963,904 | 11/1931 | Hodgson | 73—230 |
| 3,183,712 | 5/1965 | Stevenson | 73—203 |

RICHARD C. QUEISSER, *Primary Examiner.*

JAMES J. GILL, *Examiner.*

J. C. GOLDSTEIN, *Assistant Examiner.*